Jan. 6, 1931.  G. W. DELL  1,787,778
DOUGH FORMING MEANS AND METHOD OF FORMING DOUGH
Filed March 27, 1929 6 Sheets-Sheet 1
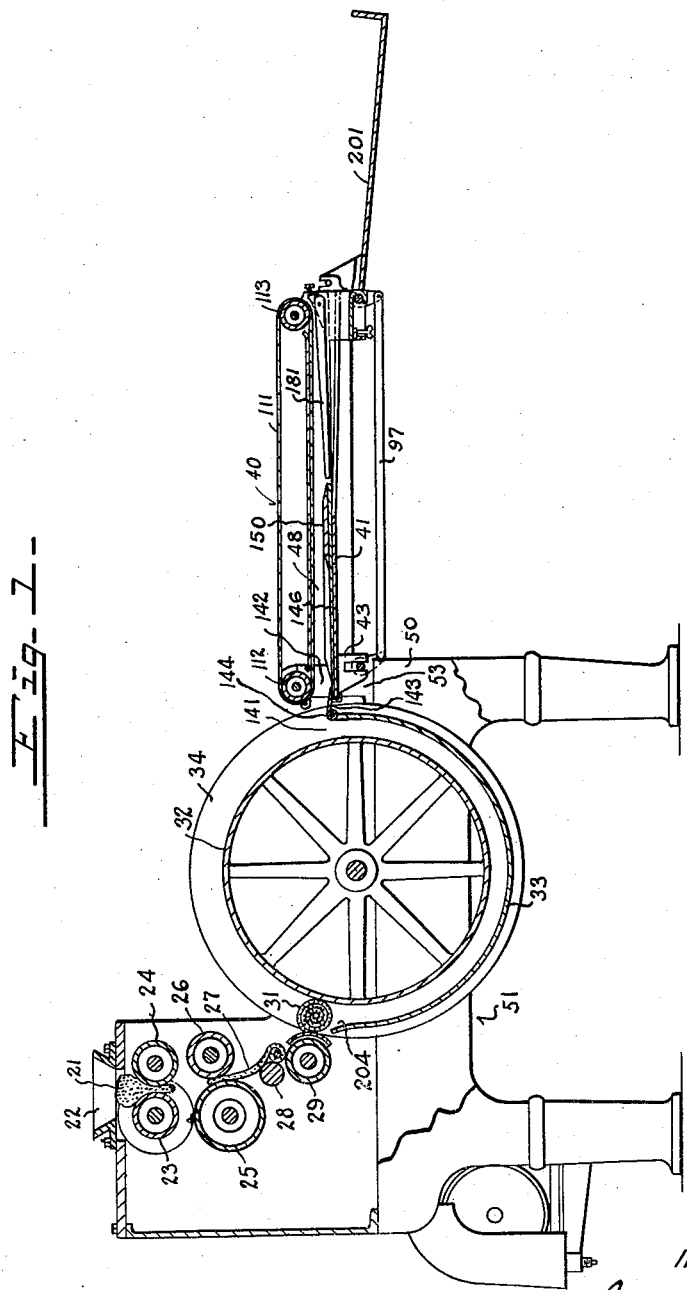
INVENTOR:

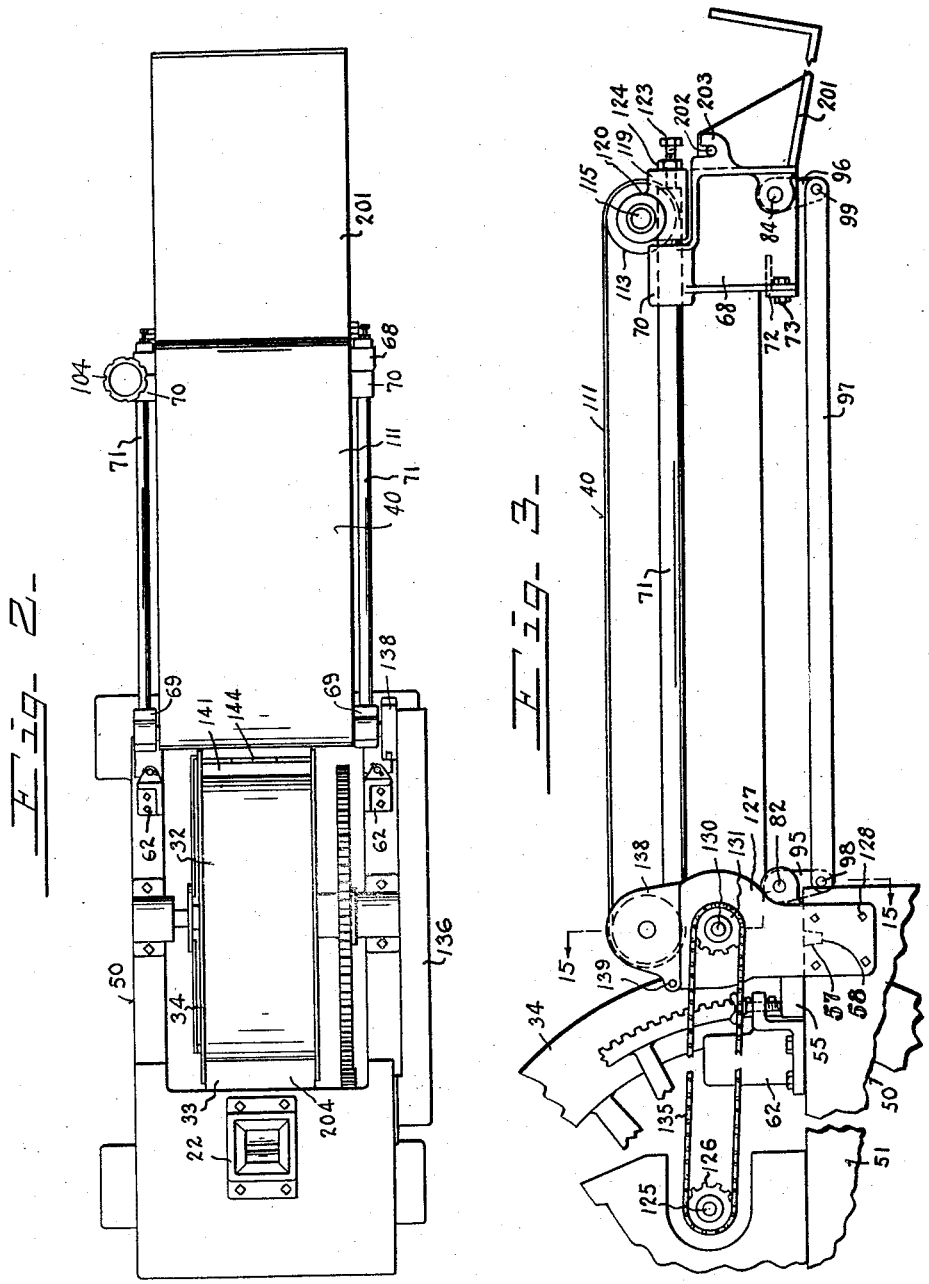

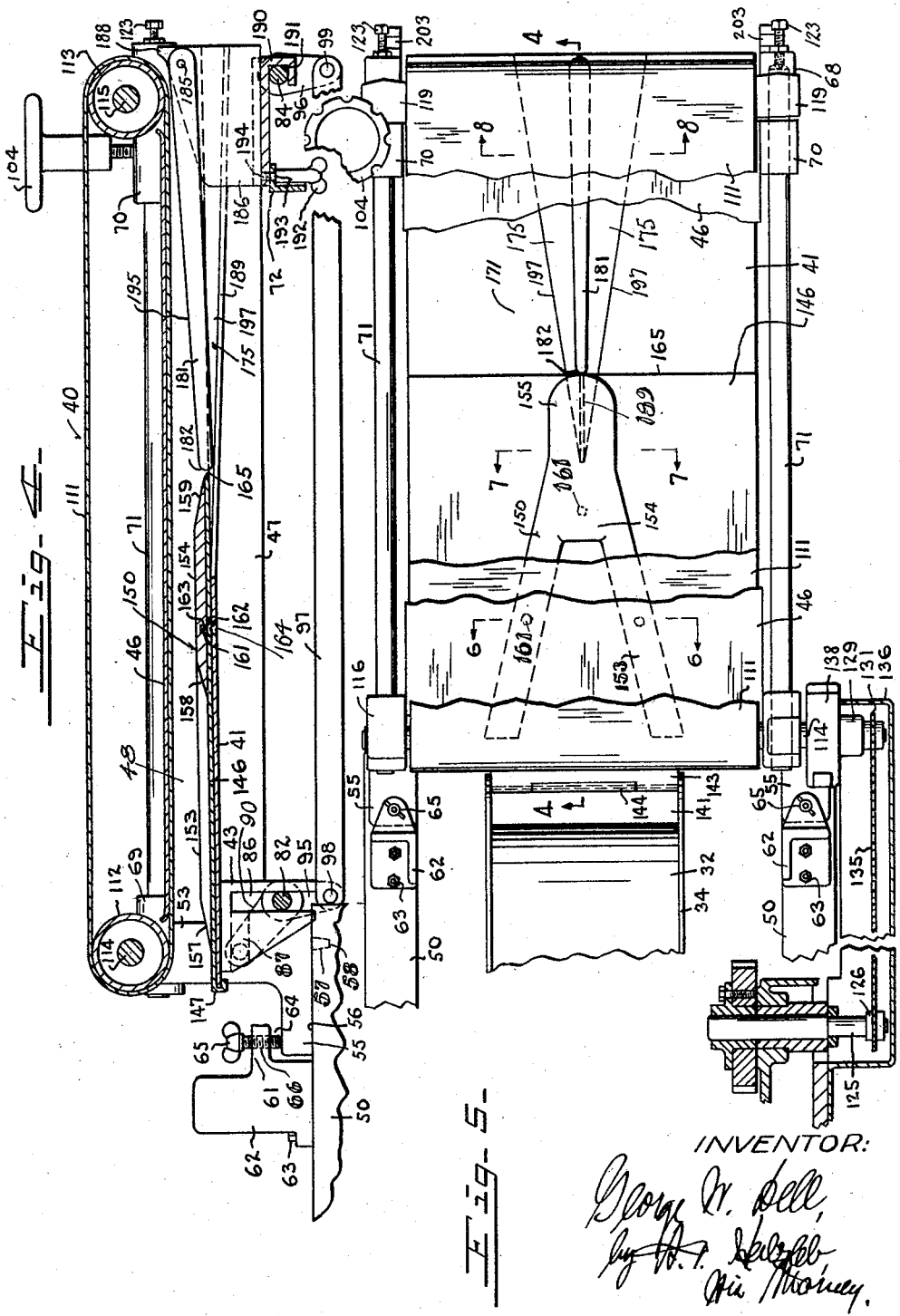

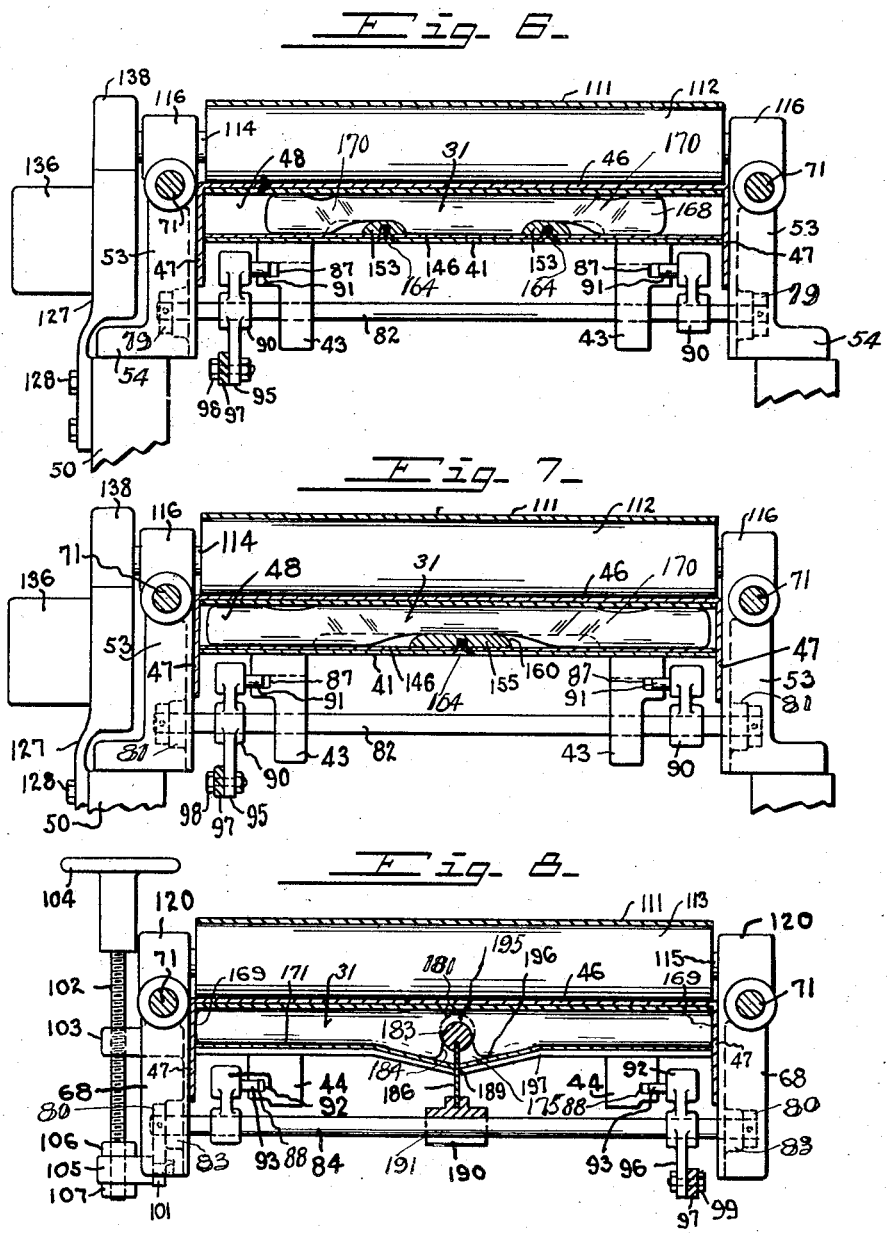

Jan. 6, 1931.  G. W. DELL  1,787,778
DOUGH FORMING MEANS AND METHOD OF FORMING DOUGH
Filed March 27, 1929  6 Sheets-Sheet 5

INVENTOR:
George W. Dell,
By his Attorney.

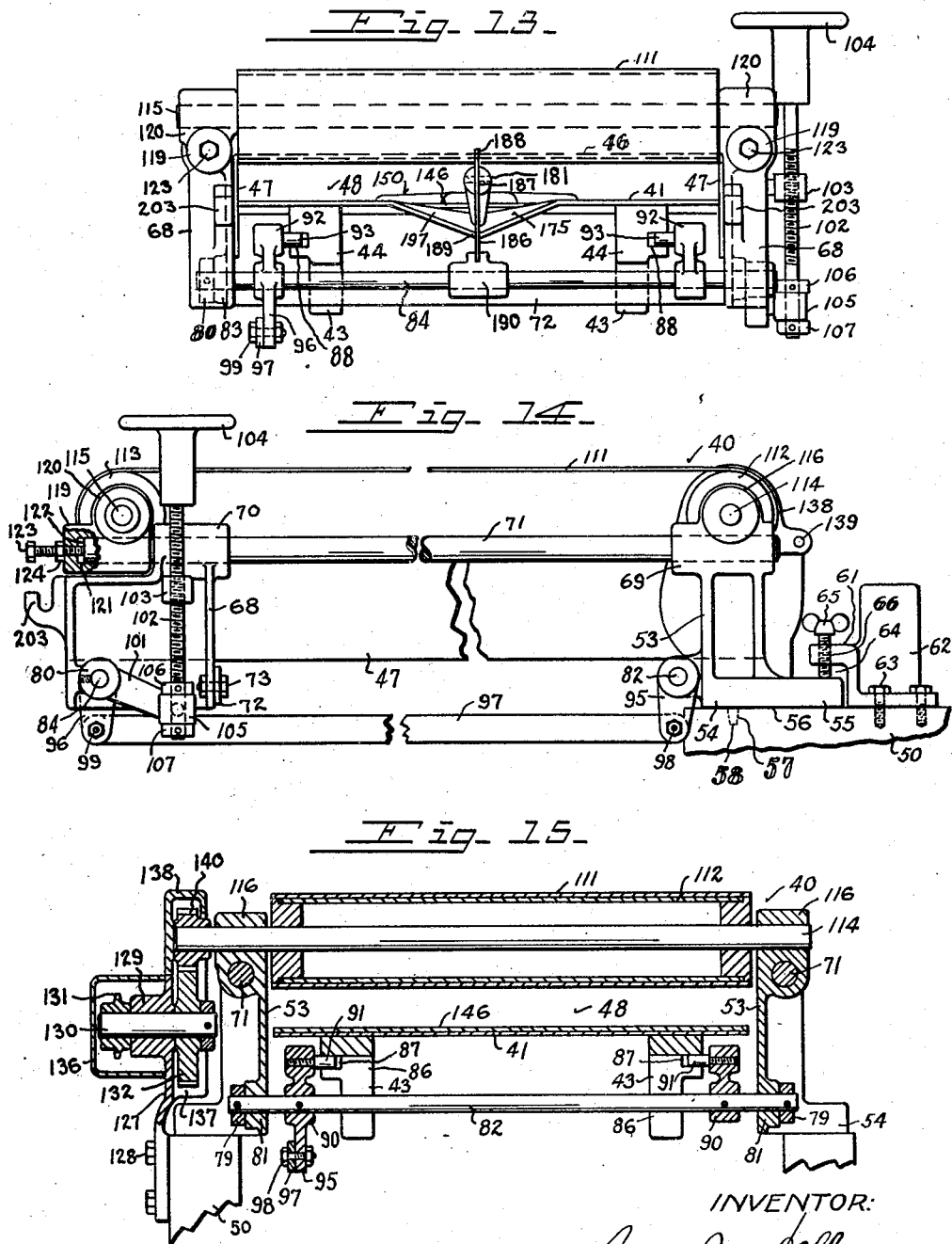

Patented Jan. 6, 1931

1,787,778

UNITED STATES PATENT OFFICE

GEORGE W. DELL, OF CINCINNATI, OHIO, ASSIGNOR TO THE TRIUMPH MANUFACTURING COMPANY, OF CINCINNATI, OHIO, A CORPORATION OF OHIO

DOUGH-FORMING MEANS AND METHOD OF FORMING DOUGH

Application filed March 27, 1929. Serial No. 350,294.

It is the object of my invention to provide novel means for lengthening a roll of dough; further, to provide novel means for dividing a lengthened roll of dough into a plurality of lengths; further, to provide novel means for adjusting the space in which the roll of dough is rolled; and, further, to provide novel means for releasably associating the dough lengthening means with a dough molder, and novel means for driving the dough lengthening means.

It is the object of my invention further to provide means acting upon a roll of dough to lengthen the same by pressures applied progressively from the end of said roll of dough inwardly while rolling the roll of dough; further, to provide means to relieve pressure upon the lengthened end of the roll of dough for permitting lengthening movement of the same; further, to provide means for lengthening the roll of dough by applying pressures from the respective ends of a rolling roll of dough progressively in substantially spiral lines toward the middle of said roll of dough, whereby to reduce the diameter and increase the length of the roll of dough; and, further, to provide novel means for dividing a lengthened roll of dough into a plurality of lengths.

It is the object of my invention further to so act upon the roll of dough as to lengthen the same by pressure applied progressively from the end of the roll of dough inwardly while rolling the roll of dough; further, to provide rolling pressures upon the respective ends of the dough progressively from its outer ends inwardly for lengthening the roll of dough from its outer ends toward its middle; and, further, to divide a lengthened roll of dough into a plurality of lengths by pressure applied progressively about the circumference of the roll of dough at the line of division thereof.

The invention will be further readily understood from the following description and claims, and from the drawings, in which latter:

Fig. 1 is a vertical longitudinal section of an apparatus embodying my improved device.

Fig. 2 is a plan view of the same partly broken away.

Fig. 3 is a side elevation of my improved apparatus, partly broken away.

Fig. 4 is a longitudinal section of the same, taken on the line 4—4 of Fig. 5, partly broken away.

Fig. 5 is a plan view of the same, partly broken away.

Fig. 6 is a cross-section of the same, taken in the plane of the line 6—6 of Fig. 5, and showing the action of a roll of dough.

Fig. 7 is a cross-section of the same, taken in the plane of the line 7—7 of Fig. 5 and showing the action of a roll of dough.

Fig. 8 is a cross-section taken in the plane of the line 8—8 of Fig. 5, and showing the action on a roll of dough for dividing the extended roll.

Fig. 13 is an end view of the extender portion of my improved apparatus.

Fig. 14 is a side elevation of the same, partly broken away; and,

Fig. 15 is a vertical cross-section of the same, taken in the plane of the irregular line 15—15 of Fig. 3, and partly broken away.

Figure 9:
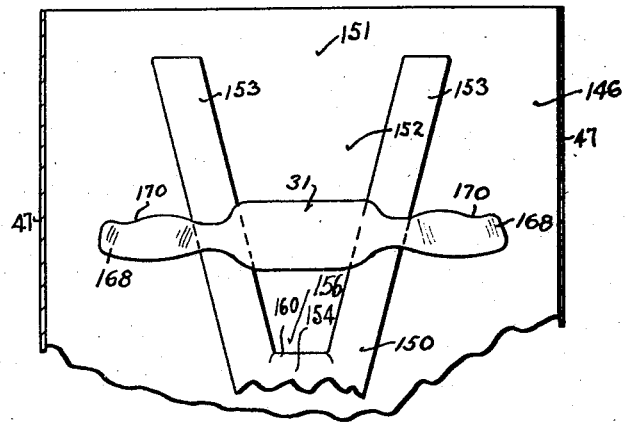
Figs. 9, 10 and 11 are plan views, partly in section and partly broken away, showing the actions on the rolls of dough shown in Figs. 6, 7 and 8.

A ball 21 of dough preferably of predetermined weight is fed through the hopper 22, of a dough molding machine between rollers 23, 24, and 25, 26, for sheeting the dough, as shown at 27, the sheet of dough progressing to rollers 28, 29, which form the sheet of dough into a roll, the roll 31 being received between a rotating sheave 32 and a coacting apron 33 for rolling the dough between said sheave and apron and between end flanges 34 on the sheave for completing the formation of the roll of dough.

The mechanism described is a mere exemplification of mechanism and other means may be employed for the purpose.

The roll 31 of dough may be of suitable length for the baked article, for instance, a loaf of bread, when rolled between the sheave and apron, and be delivered in suitable manner from the sheave and apron for proofing and other subsequent operations for such loaf of bread.

It is often desirable, however, to lengthen the roll of dough for the purpose of making a long loaf, or for the purpose of lengthening the same sufficiently for dividing the same into a plurality of loaves, or for making rolls or other smaller articles of bakery goods.

Live dough such as is contained in the roll 31 of dough has a tendency to return to its normal shape after stresses are applied for altering its shape. It is also desirable, in altering the shape of the roll of dough, that the gases contained therein shall not be exuded and shall remain evenly distributed throughout the mass of dough.

I have found that lengthening the roll of dough is best accomplished by applying rolling lengthening pressure first at the ends of the roll and progressively moving said pressure toward the middle of the roll while at the same time leaving the lengthening ends substantially free to be moved lengthwise for extending or lengthening the roll of dough, and relieving the lengthened parts of the roll of dough from excess pressure which would tend to squeeze out the gases in the dough or rupture the walls of the cells in which the gases are contained, with a consequent danger of the formation of undesirable enlarged gas pockets. My improved treatment of the roll of dough retains the life of the dough throughout the roll of dough.

I have preferred to apply these pressures from the ends of the roll of dough toward the middle of the roll of dough along spiral lines around the periphery of the roll while the roll of dough is being rolled and preferably while the unextended portion of the roll of dough is subjected to pressure and the extended ends of the roll of dough have relief of pressure, so that said ends may move or be squeezed endwise without much resistance to such endwise movements.

I have exemplified an apparatus whereby such operations upon the roll of dough may be performed.

The apparatus exemplified, which is in the nature of a dough molder, and may for convenience be termed a dough extender 40, comprises a bed 41, shown as a plate having depending lugs 43, 44, fixed thereto. These lugs are at the respective corners of the plate. An inverted U-shaped plate comprises an upper transverse plate portion 46 and depending side portions 47, the latter forming side walls for a dough rolling space 48. This plate forms a frame member for an extender frame, which latter is arranged to be detachably secured to the frame 50 of the dough molder 51.

Bearing members 53 are fixed to the side walls 47 at the feed-in end of the extender at the respective sides of the frame thereof, and are provided with feet 54, having rearwardly projecting lugs 55, the lower faces of which are arranged to rest on the upwardly presented faces 56, at the feed-out end of the molder. Pins 57 extend downwardly from said feet and are received in holes 58 in the molder frame 50, forming shoulders for positioning the extender frame in forward and rearward directions with relation to the molder frame.

Lugs 61 are on lug-pieces 62 secured to each side of the molder frame by bolts 63. The lugs 61 project forwardly for forming spaces 64 thereunder, in which the lugs 55 are received when releasably assembling the extender on the molder. Wing-bolts 65 are threaded in threaded apertures 66 in the lugs 61 and are arranged to bear upon the lugs 55 for clamping the lugs 55 and the frame of the extender in fixed relation to the frame of the molder, for securing the extender in over-hanging position with relation to the molder.

Bearing-pieces 68 are secured to the respective side walls 47 at the feed-out end of the extender.

The bearing-pieces 53, 68, at the respective sides of the extender are respectively provided with bearings 69, 70. Tie-rods 71 are received in the bearings 69, 70, of the bearing-pieces at each side of the extender and are fixed in said bearings. A cross-tie 72 connects the bearing-pieces 68 and is secured to said respective bearing-pieces by bolts and nuts 73. This cross-piece is shown as an angle iron. It rigidly connects the bearing-pieces 68.

The bearing-pieces 53 are provided with bearings 81 in which a rocker-rod 82 rocks. The bearing-pieces 68 are provided with bearings 83 in which a rocker-rod 84 rocks. Collars 79, 80, fixed to the respective ends of the rocker-rods hold said rocker-rods endwise and strengthen the frame. The depending lugs 43 are provided with upright slots 86 received about the rocker-rod 82, the walls of said slots coacting with the rocker-rod for positioning the bed endwise in the frame. The depending lugs 44 are shorter and need not be provided with upright slots.

The depending lugs 43 are provided with substantially horizontal slots 87 and the depending lugs 44 are provided with substantially horizontal slots 88. The rocker-rod 82 has arms 90 fixed thereto, provided with pins 91 received in the slots 87. The rocker-rod 84 has arms 92 fixed thereto, provided with pins 93 received in the slots 88 in the lugs 44. Arms 95, 96, depend from the rocker-rods, a link 97 is articulated at its respective ends with said depending arms, as by the pivot-bolts 98, 99, the bolts having suitable nuts thereon for forming jointed connections between said link and said depending arms.

An operating arm 101 is fixed to the rocker-rod 84, and is shown extending from one of the collars 80. A screw 102 has threaded connection in a threaded bearing 103 pivoted to one of the bearing-pieces 68. This screw is preferably an upright screw having an upwardly presented handle 104 thereon. A bearing 105 is pivotally connected with the operating arm 101. The lower end of the screw is journaled in this bearing, collars 106, 107, being fixed to the operating screw at the respective ends of said bearing for permitting turning of said screw but holding the screw endwise with relation to the bearing, so that axial movement of the screw in its threaded bearing 103 is translated into a rocking motion of the arm 101 and rocker-rod 84, for rocking said rocker-rod and, through the medium of the link 97, rocking the rocker-rod 82. The arms and the rocker-rods form bell-crank levers for raising and lowering the bed.

The bed is readily removable, as by swinging the arms 90, 92, rearwardly until the pins 91, 93, thereon move out of the slots 87, 88. Thereupon the bed may be raised until the walls of the slot 86 are free from the rock-shaft 82, and the bed may then be moved forwardly out of the end of the frame. This ready removal is desirable for cleaning purposes and for substitution of other beds.

The supporting surface of the bed is preferably inclined upwardly toward the feed-out end of the extender for reducing the dough-space above the bed toward its feed-out end for aiding in squeezing the roll of dough as it is rolled through said space.

The means for rolling the roll of dough is shown as an endless belt 111, traveling about rollers 112, 113, on shafts 114, 115. The lower or feeding stretch of the belt is located under the transverse plate portion 46, this plate portion or plate forming a resistance part for the feeding stretch of the belt for holding the feeding stretch of the belt downwardly for rolling and pressing action on the roll of dough.

The bearing members 53 are provided with bearings 116 for the shaft 114. Bearing-blocks 119 are provided with bearings 120 for the shaft 115. These bearing-blocks are provided with sockets 121 received about the forwardly extending ends 122 of the tie-rods 71. Adjusting screws 123 are threaded in the end walls of said sockets and bear against the forward ends of the tie-rods for adjusting the bearing-blocks lengthwise of the tie-rods and thereby adjusting the tension of the endless belt at the respective sides of the same. Jam-nuts 124 hold the adjusting bolts in adjusted positions.

One of the shafts of the dough molder, exemplified as the shaft 125 has a sprocket-wheel 126 fixed thereto. A bearing-bracket 127 is secured to the end of the molder frame, as by bolts 128. This bracket is provided with a bearing 129 in which a stub-shaft 130 is journaled. This shaft has a sprocket-wheel 131 fixed at its outer end and a gear 132 fixed at its inner end.

A sprocket-chain 135 is received about the sprocket-wheels for rotating the gear 132 preferably continuously during operation of the molder. A cover 136, suitably secured to the molder frame, is suitably received about the sprocket-wheels and sprocket-chain for protectingly covering the same. The gear 132 is located in a gear recess 137 of the bearing-bracket 127, the upper portion of the gear protruding above the walls of said recess.

A gear-cover 138 is pivoted to the bearing-bracket, as by a hinge 139.

The end of the shaft 114 is provided with a gear 140 fixed thereto. This gear is arranged to mesh with the gear 132, and is received under the cover 138 when the extender frame is secured to the molder frame. The cover 138 normally remains closed whether or not the gear 140 is thereunder, the cover being swung to expose the gear 132 while the extender frame is being secured to the molder frame.

The roll 31 of dough is arranged to be automatically fed from the feed-out mouth 141 of the molder into the feed-in mouth 142 of the extender, the inertia of motion of the roll of dough carrying the same over the feed-out lip 143 of said feed-out mouth, pivoted by a hinge 144 to the apron 33.

The dough-space in the extender is preferably wider than the dough-space in the molder for permitting lengthening of the roll of dough.

Figure 12:
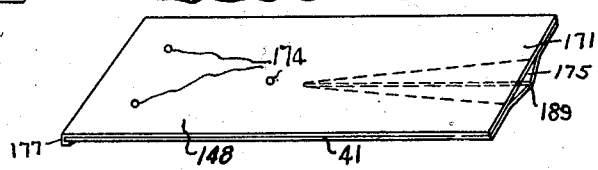
Fig. 12 is a perspective view showing a supplemental plate having a plane surface covering the depressions in the bed-plate.

Lengthening means 150, shown as a rib-structure, for the roll of dough are located in the dough-space of the extender. I prefer to mount the same on a supplemental plate 146 received in the dough-space and provided with a reverse bend 147 or hook at its rear end received over the rear edge of the bed-plate. This supplemental plate may extend only part-way of the length of the bed when employing a divider, as exemplified in Figs. 1, 4 and 5, or said supplemental plate may extend as a plane plate 148 in rear of said lengthening means throughout the area of the bed for squeezing the entire length of the lengthened roll of dough, as exemplified in Fig. 12.

The roll 31 of dough is received in the mouth 151 of a hollow 152. There are elevated portions 153 at the respective sides of the hollow, these elevated portions being preferably formed of ribs. They converge away from the mouth of the hollow. There is an elevated portion 154 at the inner or feed-out ends of the elevated portions 153, the elevated portions being substantially of V-form, and the inner elevated portion being preferably extended, for instance as a shank 155, for rendering the elevated portions of substantially a blunted Y-form. The base 156 of the hollow is preferably narrow to permit substantial approach between the converging side elevations at the sides of the hollow, but at the same time prevent the lodgment of dough therein.

The feed-in ends of the side elevated portions are preferably slanting as shown at 157, for permitting gradual climbing of the ends of the roll of dough upon the side elevations, and the feed-in end and the feed-out end of the inner elevated portion are preferably formed slanting, as shown at 158, 159, for preventing gouging of the dough as the extended roll of dough rolls on and off said inner elevation.

These elevations are preferably in the form of ribs extending upwardly from the plane of the plate. The side walls of the ribs are preferably rounded as shown at 160.

The ribs preferably form the rib structure 150 which is releasably secured to the plate, as by means of screws 161 received through holes 162 in the plate and threaded into threaded holes 163 in the bottom face of the rib-structure. If desired, the supplemental plate may be omitted and the rib-structure secured to the bed, as by means of similar screws passing through holes 164 in the bed and threaded into the threaded holes 163 in the bottom face of the rib structure.

The front edge 165 of the supplemental plate 146 is preferably slanted for avoiding pressing or cutting into the dough.

The spread feed-in ends of the V are preferably in line with the end flanges 34, or are so located as to receive the ends of the roll 31 of dough thereon. The elevations reduce the height of the dough-space. The ends of the roll of dough first contact said elevations, which act on the ends of the roll of dough while the roll of dough is being rolled thereover for extending the roll of dough lengthwise from its outer ends inwardly and reducing the cross-sectional area of the roll of dough from its outer ends inwardly for lengthening the roll of dough.

The height of the dough space outside said elevations is greater than at said elevations for relief of pressure upon the lengthened ends 168 of the roll of dough, thereby relieving the lengthening ends of the roll of dough from pressure and permitting ready extending or lengthening of said outer ends.

The elevations act progressively inwardly upon the roll of dough, preferably along spiral lines as long as said elevations are slanting with relation to the path of travel of the roll of dough. The middle portion of the roll of dough is acted upon by the closed base portion or inner part of the elevation for lengthening the middle portion of the roll of dough. This base or middle portion of the elevation is preferably sufficiently long so that all portions of the middle circumference of the roll of dough are acted on by the elevation for lengthening the same.

When the roll of dough has been lengthened, its outer end faces 169 preferably have rubbing contact with the side walls 47 for smoothing said outer ends.

The slanting side elevations act spirally on the roll of dough for lengthening the same, and form shallow spiral grooves 170 in the end portions of the roll of dough, which, however, are preferably ironed out for forming a cylindrical roll of dough by the plane portions 171, of the bed in rear of said elevations, and the rear or feed-out end of said plane portions preferably approach the opposing portions of the feed-belt for reducing the height of the dough space and applying pressure upon the extended roll of dough for fixing said extended roll of dough in lengthened relation.

This is accomplished for all practical purposes in spite of the depression 175 hereinafter described in said bed, although, if it is desired to have said plane portion of the bed extend entirely across the dough-space, the supplemental plate 148 may be provided, and provided with a similar rib-structure, or to which the rib-structure on the plate 146 may be transferred and secured by securing means the same as the securing screws which fasten the rib-structure to the plate 146. The securing screws 161 may be received through holes 174 in the plate 148. The supplemental plate 148 is placed upon the bed in place of the supplemental plate 146, the supplemental plate 148 being provided with a similar returned end or hook 177 for locating the supplemental plate 148 on the bed. The supplemental plate 148 may be employed also when it is not desired to divide the lengthened roll of dough.

The dividing means hereinafter described are releasably secured in the extender and are removed when dividing of the roll of dough is not desired.

I have found that in dividing a length of roll of dough into a plurality of lengths it is desirable to so divide the roll of dough that a rubbing effect is produced upon the proximate end faces of the divided lengths of dough, and that the division take place as the result of a squeezing pressure rather than a cutting of the dough.

I have therefore provided an inclined elevation in the dough space, the incline whereof is preferably very gradual toward the feed out end of said space, and have provided said elevation with a blunt squeezing face which acts progressively about the circumference of the roll of dough at the line of desired division, for gradually squeezing the roll crosssectionally, preferably without breaking the skin on the circumference of the roll, and gradually working this skin at the division toward the axis of the roll. The elevation is also preferably provided with side faces against which the proximate end faces of the lengths of dough rub during such rolling and squeezing action, for amplifying the skin on said proximate end faces, supplementing the skin stretched by the squeezing action of said elevation.

I have shown the elevation in the form of a strip 181, the upper face of which is inclined upwardly toward the feed-out end of the dough-space. The inner end of the strip is preferably rounded, as shown at 182, for readily receiving the roll of dough without breaking the skin thereof. This strip may be in the form of a bar. It has side-faces 183, against which the proximate end faces 184 of the lengths of dough being divided move or rub for forming or supplementing the skin.

This strip is preferably releasably received in the dough-space. It is shown hingedly mounted by a pin 185 on a blade 186, the blade being received in a slot 187 in the strip and preferably extending slightly above the strip, as shown at 188, for dividing any string of dough which may be unsevered by the strip.

The blade is received through a slot 189 in the bed, and is secured to an anchoring part 190, provided with a recess 191 received about the rocker-rod 84. A wing-bolt 192 has a shoulder 193 and a threaded end 194. The threaded end is received through a hole in the cross-tie 72 and into a threaded hole in the anchoring part for clamping the anchor plate to the cross-tie 72 and consequently securing the blade and the strip in place.

The dividing strip 181 is of substantial width and has an upper rounded dividing face 195. A portion of the dough about the line of division is therefore displaced endwise outwardly at each side of the dividing strip, as shown at 196. I prefer that this displacement take place without unduly squeezing the dough, so that upon division of the roll of dough, the dough of said displaced portion will resume the shape to which it had been squeezed in lengthening the roll of dough, so that uniform divided lengths of dough are provided.

In order to accomplish this, I provide the depression 175 at each side of the dividing strip, the cross-sectional area of this depression preferably increasing with the elevation of the strip, so that greater relief space is provided as the strip squeezes into the roll of dough.

I have shown these depressions provided by bending the bed-plate downwardly in triangular form at each side of the dividing strip, as shown by the bent portions 197. For ease in the formation of these bent portions, the slot 189 may be extended rearwardly to substantially the rearward end of said depressions. The rear end of the strip may lie in said depressions, preferably proximate to the rear end of the elevations provided for lengthening the roll of dough.

A feed-out shelf 201 may be provided at the feed-out end of the apparatus. This apron is preferably removable, as by providing the same with pintles 202 received in hooks 203 extending from the rear end of the bearing-pieces 68.

In operation, a ball 21 of dough of preferably predetermined weight is fed through the hopper 22 between the sheeting rolls 23, 24 and 25, 26, the sheet of dough being then rolled into a roll by the rolling rolls 28, 29, the roll of dough dropping into the feed-in mouth 204 between the drum 32 and apron 33 of the molder, wherein the dough is rolled to a length determined by the side flanges 34, on said drum. The molded roll of dough 31 is then delivered out of the feed-out mouth 141 of the molder and automatically delivered to the feed-in mouth 142 of the extender.

Figure 10:
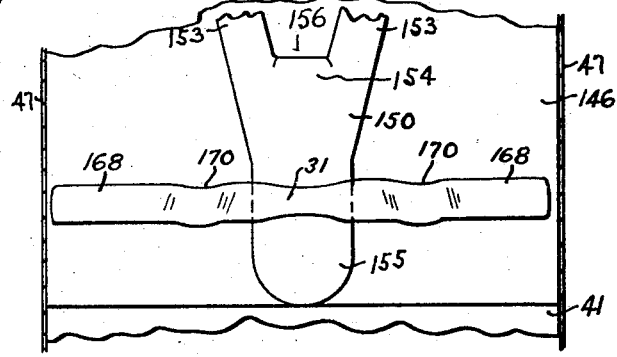
Figure 11:
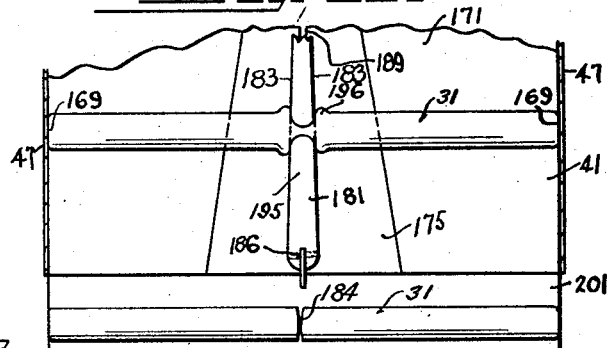

The roll of dough is then extended from its outer ends inwardly by the converging squeezing ribs 153, whereby the ends of the roll of dough are squeezed outwardly lengthwise, the outer skin of the roll of dough being maintained intact but merely stretched, the outer ends of the roll of dough being reduced in cross-section and lengthened as indicated at 168 in Figs. 6 and 9, which stretching and lengthening gradually progresses toward the middle or inner portion of the roll of dough, which middle portion of the roll of dough is squeezed endwise and reduced in cross-section by an inner elevation 154 at the base of the substantially V-shaped rib-structure, as indicated in Figs. 7 and 10.

The height of the dough-space at the respective sides of the squeezing elevations is greater than at said squeezing elevations for permitting ready endwise shifting of the lengthening ends of the roll of dough, there being just sufficient contact with said lengthening ends to cause rolling of the same and to aid in ironing out the spiral grooves formed in the lengthened portions of the roll of dough by the slanting ribs.

Applying pressure locally and progressively at various points along the roll of dough, especially when such pressure is along spiral lines, and then immediately relieving said pressure at the outer sides of the pressure projections, enables the gases to be momentarily compressed and shifted in their respective cells or pockets and enables the cells or pockets to rearrange themselves in lengthened form, while remaining evenly distributed throughout the mass of dough, they being set in such lengthened form by the subsequent setting pressure applied to the lengthened roll of dough.

If it is desired to divide the roll of dough into a plurality of lengths, it is caused to move along the dividing strip 181, which strip is of comparatively substantial width and acts on the roll of dough progressively about its circumference on the line of division for squeezing the roll of dough at said line of division and causing the skin at the circumference of the roll of dough to stretch about the proximate end-faces of said lengths, said proximate end-faces also having rubbing contact with the sides of said strip, for forming new skin or supplementing the stretched skin at said proximate ends.

The displaced portions 196 of the roll of dough at said proximate ends finds relief in the depressions 175 at the sides of said strip, so as to avoid squeezing action on said displaced ends in order that when the separate lengths of dough are delivered beyond the divided strip, the ends may resume their previous cross-sectional dimensions for providing divided lengths of dough of uniform cross-sectional dimensions throughout their lengths. The extreme ends of the roll of dough may make rubbing contact with the side walls 47 for forming said ends of skins of dough.

The dough-space between the bed and traveling feed apron gradually diminishes toward the feed-out end of the dough-space, for ironing out any spiral grooves that may be left in the lengthened roll of dough.

The rib-structure and the dividing strip are releasably secured in the machine so that either or both may be employed and, if desired, the rib structure may be on a plate 148 which is substantially co-extensive with the bed and cover the depressions 175, so that squeezing rolling pressure may be exerted upon the entire length of the lengthened roll of dough for fixing the length of the roll of dough. The extender frame is releasably secured in overhanging relation to the molder frame so that the molder may be used with or without the extender.

In associating the extender frame with the molder frame, the feed-in end of the extender frame is moved toward the feed-out end of the molder frame, with the feed-out end of the extender frame tilted upwardly, so that the lugs 55 of the extender frame are readily received under the lugs 61 on the molder frame and the pins 57 are readily received in the holes 58. The gear-cover 138 having been raised to expose the gear 132 on the molder frame, the gear 140 on the extender frame readily finds meshing relation with the gear 132 on the molder frame in thus assembling the extender frame in overhanging relation on the molder frame, without shifting or adjustment of gears for the purpose, and without adjustment or placement of any driving parts, as the gear 132 is in constant driving relation with a rotating element of the molder.

The extender frame is of light and substantial construction, and the adjustment of the elevation of the bed is obtained by strong and substantial means readily operated.

Having thus fully described my invention, what I claim as new, and desire to secure by Letters Patent, is:

1. In a device of the class described, the combination of a pair of parts imparting rolling motion to a roll of dough in the space between said parts and provided with a hollow whose mouth is presented toward the incoming roll of dough and converging elevated portions at the respective sides of said hollow reducing said space at said elevated portions whereby to squeeze said roll of dough progressively from its respective ends toward its middle to lengthen said roll.

2. In a device of the class described, the combination of a pair of opposed coacting faces and means for causing rolling of the roll of dough in the space between said faces, means in said space comprising converging elevations progressively squeezing the roll of dough from its ends inwardly for progressively lengthening the roll of dough from its ends inwardly, and an inclined elevation in said space in rear of said last-named means along which the lengthened roll of dough is rolled for division of the lengthened roll of dough into a plurality of lengths.

3. In a device of the class described, the combination of a pair of parts imparting rolling motion to a roll of dough in the space between said parts and provided with a hollow whose mouth is presented toward the incoming roll of dough, and converging elevated portions at the respective sides of said hollow and an elevated portion at the base of said hollow reducing said space at said elevated portions whereby to squeeze said roll of dough progressively from its respective ends inwardly for progressively reducing the cross-sectional area of said roll of dough and progressively lengthening the same from its outer ends inwardly.

4. In a device of the class described, the combination of a pair of parts imparting rolling motion to a roll of dough in the space between said parts and provided with a hollow whose mouth is presented toward the incoming roll of dough, converging elevated portions at the respective sides of said hollow and an elevated portion at the base of said hollow reducing said space at said elevated portions whereby to squeeze said roll of dough progressively from its respective ends inwardly for progressively reducing the cross-sectional area of said roll of dough and progressively lengthening the same from its outer ends inwardly and an inclined elevation in rear of said elevated portion at the base of said hollow, said inclined elevation extending lengthwise of the path of travel of the roll of dough and at its greatest elevation being substantially the height of said space for division of said reduced roll of dough into a plurality of lengths.

5. A device of the class described comprising a pair of parts imparting rolling motion to a roll of dough in the space between said parts, and provided with a hollow whose mouth is presented toward the incoming roll of dough and converging elevated portions at the respective sides of said hollow reducing said space at said elevated portions whereby to squeeze and lengthen said roll of dough progressively from its respective ends toward its middle, and said pair of parts provided with coacting faces beyond said elevated portions for rolling and squeezing the lengthened roll of dough.

6. In a device of the class described, dough rolling means comprising a pair of squeezing ribs which converge toward each other and progressively lengthen a roll of dough from its outer end inwardly by pressure along substantially spiral lines on said roll of dough whereby the lengthened roll of dough is provided with substantially spiral grooves, said dough rolling means comprising coacting pressure portions acting on said lengthened roll of dough to iron out said grooves.

7. A device of the class described comprising a dough rolling means comprising a plate and an opposed traveling belt whose opposed faces converge toward the feed-out end of said dough rolling means, and a substantially V-shaped rib-formation on said plate presented with the mouth of said V toward the feed-in end of said dough rolling means.

8. A device of the class described including a dough rolling means comprising a plate and an opposed traveling belt providing a space in which the roll of dough is rolled, a substantially V-shaped rib-structure and a dividing rib-structure in said space, the mouth of said substantially V-shaped rib-structure presented toward the incoming roll of dough, said substantially V-shaped rib-structure acting to lengthen the roll of dough and said dividing rib-structure acting for dividing the lengthened roll of dough into a plurality of lengths while said roll of dough is being rolled through said space.

9. A device of the class described comprising a pair of coacting faces and means for rolling a roll of dough in the space between said faces, and an inclined blunt squeezing elevation spaced from the side margins of said faces and extending lengthwise of the direction of travel of the roll of dough between said faces, along which elevation the portion of the roll of dough proximate thereto is moved, said inclined blunt squeezing elevation acting to maintain the skin of the roll of dough whole while squeezing the dough inside said skin endwise of the roll of dough said inclined elevation gradually contracting said space at said elevation for division of said roll of dough into a plurality of lengths of rolls of dough.

10. A device of the class described comprising a pair of coacting faces and means for rolling a roll of dough in the space between said faces, and an inclined blunt elevation extending lengthwise of the direction of travel of said roll of dough between said faces along which elevation the portion of the roll of dough proximate thereto is moved, said blunt elevation acting to squeeze the dough of said roll at said blunt elevation endwise and stretching the skin of said roll about the proximate ends of said squeezed portions, said inclined elevation gradually contracting said space at said elevation for division of said roll of dough into a plurality of lengths of said rolls of dough, and depressions immediately at the respective sides of said elevation into which the dough displaced by said elevation finds relief from pressure.

11. A device of the class described comprising a pair of coacting faces and means for rolling a roll of dough in the space between said faces, and an inclined blunt elevation between said faces extending lengthwise of the direction of travel of said roll of dough, along which elevation the portion of the roll of dough proximate thereto is moved, said inclined blunt elevation gradually contracting said space at said elevation and acting to squeeze the dough in said roll endwise at each side of said inclined blunt elevation while maintaining the skin of said roll whole, and forming an unsevered string of dough at said elevation and a severing edge at the feed-out end of said elevation acting to sever said string of dough for dividing said roll of dough into a plurality of lengths of rolls of dough.

12. A device of the class described comprising a supporting plate, a traveling apron coacting therewith and forming a dough rolling space between said plate and said apron, and an inclined blunt strip in said space extending lengthwise of the direction of travel of the roll of dough and having only a slight degree of inclination between said plate and said apron for gradually substantially closing said space at said strip for dividing said roll of dough into a plurality of lengths, and said strip acting to squeeze the dough of said roll at said strip endwise of said roll and stretching the skin of said roll about the proximate ends of said lengths, and said blunt strip provided with side faces against which said stretched skins and the adjacent ends of said plurality of lengths move for providing said adjacent ends with a complemental skin of dough.

13. A device of the class described comprising a plate, a feed-apron coacting therewith for forming a space between said plate and said apron in which a roll of dough is rolled, and a blunt dividing strip in said space extending lengthwise of the direction of travel of said roll of dough and having only a slight degree of inclination between said plate and said apron, said blunt dividing strip acting to squeeze the dough of said roll endwise at said blunt dividing strip for momentarily enlarging said roll at said blunt dividing strip at each side of said strip, and said plate provided with depressions immediately at the respective sides of said strip extending lengthwise of said strip into which the enlarged portions of said roll of dough displaced by said strip are arranged to be received.

14. A device of the class described comprising a plate, a traveling coacting part provided with a traveling face coacting with said plate for forming a space between said plate and said coacting part in which a roll of dough is rolled, and a dividing strip in said space extending lengthwise of the direction of travel of said dough and having a slight degree of inclination between said plate and said coacting part, said strip provided with side rubbing faces coacting with the dough, and said plate provided with depressions at the respective sides of said strip into which the dough displaced by said strip is received, said strip and the walls of said depression receding in opposite directions from the plane of said plate, and said depressions increasing in width toward the feed-out end of said plate.

15. In a device of the class described, the combination of a pair of rolls, a feed-belt arranged loopwise about said rolls and having a lower feeding stretch between said rolls, a bed coacting with said lower stretch for forming a dough feeding space between said bed and said lower stretch, an inverted plate of channel form in cross-section forming a backing-plate for said lower stretch of said feed-belt and side walls for said dough feeding space, said bed located between said side walls and forming a joint between the side edges of said bed and said side walls closing said dough feeding space, bearing-supports at the respective corners of said channel-plate fixed to said side walls, bearings therein, rock-shafts in said bearings, arms on said rock-shafts coacting with said bed for adjusting said bed to elevation, a length connecting said rock-shafts for combined rocking movements of said rock-shafts, and adjusting means for one of said rock-shafts.

16. In a device of the class described, the combination of a pair of rolls, a feed-belt arranged loopwise about said rolls and having a lower feeding stretch between said rolls, a bed coacting with said lower stretch for forming a dough-feeding space between said bed and said lower stretch, an inverted plate of channel form in cross-section forming a backing plate for said lower stretch of said feed-belt and side walls for said dough-feeding space, said bed located between said side walls and forming a joint between the side edges of said bed and said side walls for closing said dough feeding space, bearing supports at the respective corners of said inverted channel plate fixed to said side walls, bearings therein, and rock-shafts in said bearings having operative connections with said bed for adjusting said bed to elevation, and said bed provided with upright guiding means received about said rock-shaft for maintaining the endwise position of said bed throughout its elevations.

17. A method of extending a roll of dough which comprises rolling the roll of dough and simultaneously compressing said roll from its outer ends inwardly for progressively reducing the cross-sectional area of said roll from its outer ends inwardly and progressively lengthening the portions of the roll so reduced.

18. A method of extending a roll of dough which comprises rolling the roll of dough and simultaneously compressing said roll from its outer ends inwardly on substantially spiral lines for progressively reducing the cross-sectional area of said roll from its outer ends inwardly and thereby lengthening said roll, and then dividing said lengthened roll of dough by transverse pressure applied progressively at the point of division about the circumference of said lengthened roll of dough.

19. A method of extending a roll of dough which comprises rolling the roll of dough and simultaneously compressing said roll on substantially spiral lines from its outer ends inwardly for progressively reducing the cross-sectional area of said roll, and relieving pressure upon said reduced ends as said ends are so reduced in cross-sectional area, and then subjecting the reduced roll to substantially uniform pressure along its length while said roll is being rolled.

In testimony whereof, I have hereunto signed my name.

GEORGE W. DELL.